(12) United States Patent
Marcus et al.

(10) Patent No.: US 8,038,199 B2
(45) Date of Patent: Oct. 18, 2011

(54) VISOR

(75) Inventors: Kónrad H. Marcus, Holland, MI (US);
Peter T. LaDuke, Holland, MI (US);
Timothy A. Bindon, Fennville, MI (US)

(73) Assignee: Marcus Automotive, LLC, Holland, MI (US)

(*) Notice: Subject to any disclaimer, the term of this patent is extended or adjusted under 35 U.S.C. 154(b) by 288 days.

(21) Appl. No.: 12/414,956

(22) Filed: Mar. 31, 2009

(65) Prior Publication Data

US 2010/0090494 A1 Apr. 15, 2010

Related U.S. Application Data

(60) Provisional application No. 61/054,916, filed on May 21, 2008.

(51) Int. Cl.
*B60J 3/00* (2006.01)
(52) U.S. Cl. .................... 296/97.9; 296/97.1
(58) Field of Classification Search .......... 296/97.11, 296/97.6, 97.8, 97.4, 97.9, 97.1
See application file for complete search history.

(56) References Cited

U.S. PATENT DOCUMENTS

| | | |
|---|---|---|
| 1,898,276 A | 2/1933 | Van Dresser |
| 1,942,663 A | 1/1934 | Saunders |
| 2,034,849 A | 3/1936 | Westrope |
| 2,101,901 A | 9/1936 | Fletcher |
| 2,226,056 A | 12/1940 | Fletcher |
| 2,228,209 A | 1/1941 | Harrington |
| 2,422,863 A | 6/1947 | Stroth |
| 2,424,500 A | 7/1947 | Peltier et al. |
| 2,454,613 A | 11/1948 | Peltier et al. |
| 2,496,129 A | 1/1950 | Moore |
| 2,498,966 A | 2/1950 | Sauer |
| 2,685,336 A | 8/1954 | Menighan |
| 2,733,763 A | 2/1956 | Nygaard |
| 2,823,950 A | 2/1958 | Harris |
| 3,159,421 A | 12/1964 | Samuelson |
| 3,343,867 A | 9/1967 | Couch et al. |
| 3,375,364 A | 3/1968 | Marcus |
| 3,767,256 A | 10/1973 | Sarkees |
| 3,834,755 A | 9/1974 | Dexter |

(Continued)

FOREIGN PATENT DOCUMENTS

DE 19713759 7/1998

(Continued)

OTHER PUBLICATIONS

International Search Report and Opinion in PCT/US2009/044636 issued Jan. 6, 2010.

*Primary Examiner* — Lori Lyjak
(74) *Attorney, Agent, or Firm* — Price Heneveld LLP

(57) ABSTRACT

A visor is mounted to a vehicle such that it pivots from a pocket in a vehicle headliner adjacent the windshield downwardly away from the windshield from the stored position to a use position. A mounting bracket coupled to the visor and mounting clip coupled to the vehicle cooperate to hold the visor in a stored position and allow its pivoting to a lowered use position and movement in connection with a pivot rod assembly on the opposite end of the visor to a side window position. The pivot rod assembly includes a cam mechanism for lowering the visor as it pivots from the front window position to the side window position. A push-push spring-loaded pivoted extender panel can be deployed from an edge of the visor to increase sun blocking.

11 Claims, 10 Drawing Sheets

U.S. PATENT DOCUMENTS

| | | | |
|---|---|---|---|
| 3,926,470 | A | 12/1975 | Marcus |
| 3,961,820 | A | 6/1976 | Spangler |
| 4,023,856 | A | 5/1977 | DeRees |
| 4,205,873 | A | 6/1980 | Viertel et al. |
| 4,248,473 | A | 2/1981 | Hildebrand |
| 4,264,100 | A | 4/1981 | Keeler, II |
| 4,435,009 | A | 3/1984 | Foggini |
| 4,468,062 | A | 8/1984 | Marcus et al. |
| 4,486,819 | A | 12/1984 | Marcus et al. |
| 4,614,375 | A | 9/1986 | Miller et al. |
| 4,623,188 | A | 11/1986 | Juraschek et al. |
| 4,655,498 | A | 4/1987 | Panzner et al. |
| 4,728,142 | A | 3/1988 | Gavagan |
| 4,736,979 | A | 4/1988 | Harvey |
| 4,828,314 | A | 5/1989 | Gavagan |
| 4,844,530 | A | 7/1989 | Mahler et al. |
| 4,978,160 | A | 12/1990 | Welschoff |
| 4,982,992 | A | 1/1991 | Vu et al. |
| 4,986,592 | A | 1/1991 | Kaiser et al. |
| 4,989,910 | A | 2/1991 | Mersman et al. |
| 4,998,765 | A | 3/1991 | Van Order et al. |
| 5,016,938 | A | 5/1991 | Tschan |
| 5,026,108 | A | 6/1991 | Leahy |
| 5,067,764 | A | 11/1991 | Lanser et al. |
| 5,104,174 | A | 4/1992 | Gute |
| 5,152,573 | A | 10/1992 | Riera |
| 5,197,777 | A | 3/1993 | Lanser et al. |
| 5,219,199 | A | 6/1993 | Smith et al. |
| 5,271,653 | A | 12/1993 | Shirley |
| 5,421,632 | A | 6/1995 | Adomeit et al. |
| 5,466,029 | A | 11/1995 | Zetterlund |
| 5,470,123 | A | 11/1995 | Snyder |
| 5,478,131 | A | 12/1995 | Marks |
| 5,490,708 | A | 2/1996 | Lee |
| 5,513,892 | A | 5/1996 | Thomas |
| 5,577,792 | A | 11/1996 | Muyres et al. |
| 5,580,117 | A | 12/1996 | Goclowski |
| 5,662,371 | A | 9/1997 | Gera et al. |
| 5,711,570 | A | 1/1998 | Wu et al. |
| 5,765,898 | A | 6/1998 | Crotty, III |
| 5,842,748 | A | 12/1998 | Cummins |
| 5,873,621 | A | 2/1999 | Kuighadush et al. |
| 6,024,399 | A | 2/2000 | Viertel et al. |
| 6,131,987 | A | 10/2000 | Rossiter |
| 6,189,947 | B1 | 2/2001 | Annan |
| 6,220,644 | B1 | 4/2001 | Tiesler et al. |
| 6,231,105 | B1 | 5/2001 | Viertel |
| 6,371,546 | B1 | 4/2002 | Jefferson |
| 6,450,560 | B1 | 9/2002 | Sturt et al. |
| 6,488,328 | B2 | 12/2002 | Quapil |
| 6,543,832 | B1 | 4/2003 | Bogdanski et al. |
| 6,547,308 | B2 | 4/2003 | Hamelink et al. |
| 6,565,140 | B2 | 5/2003 | Wells |
| 6,612,637 | B1 | 9/2003 | Crotty, III |
| 6,666,493 | B1 | 12/2003 | Naik |
| 6,899,371 | B1 | 5/2005 | Hammond |
| 6,908,136 | B2 | 6/2005 | Böhm et al. |
| 7,077,454 | B1 | 7/2006 | Schambre |
| 7,090,378 | B1 | 8/2006 | Zadro |
| 7,111,890 | B2 | 9/2006 | Delus et al. |
| 7,556,308 | B2 | 7/2009 | Lee et al. |
| 2009/0152892 | A1 | 6/2009 | Bohner et al. |

FOREIGN PATENT DOCUMENTS

| | | |
|---|---|---|
| JP | 59029511 | 2/1984 |
| JP | 3114361 | 8/2005 |
| KR | 100324383 | 2/2002 |
| KR | 1020070047080 | 5/2007 |
| KR | 1020080017328 | 2/2008 |
| WO | WO8500028 | 1/1985 |
| WO | WO9408812 | 4/1994 |

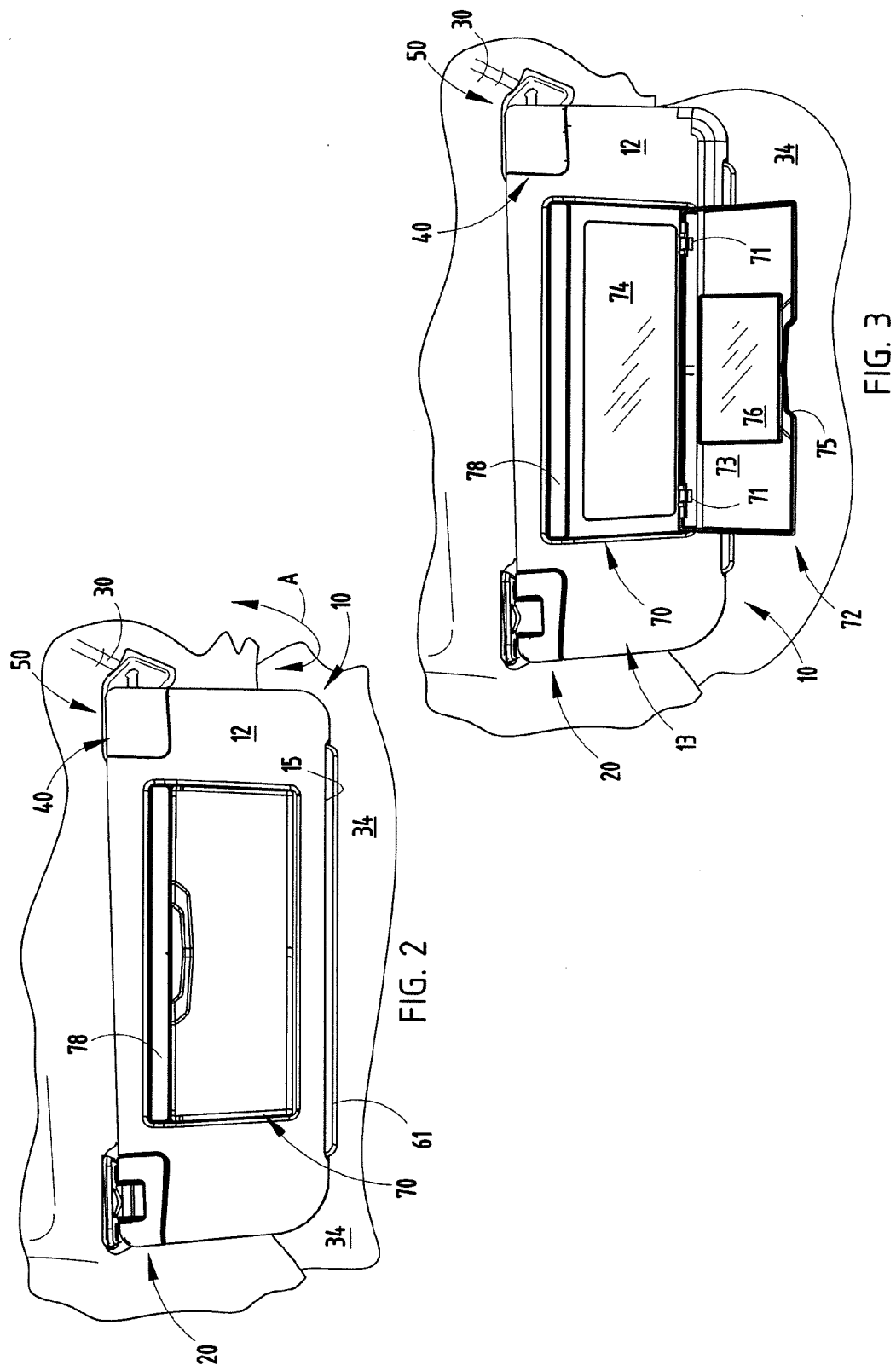

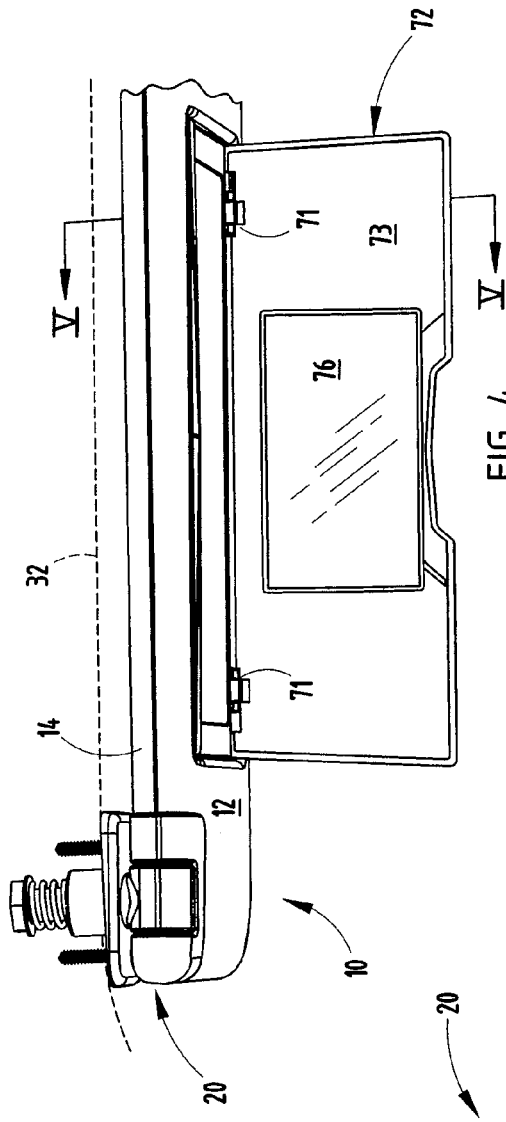
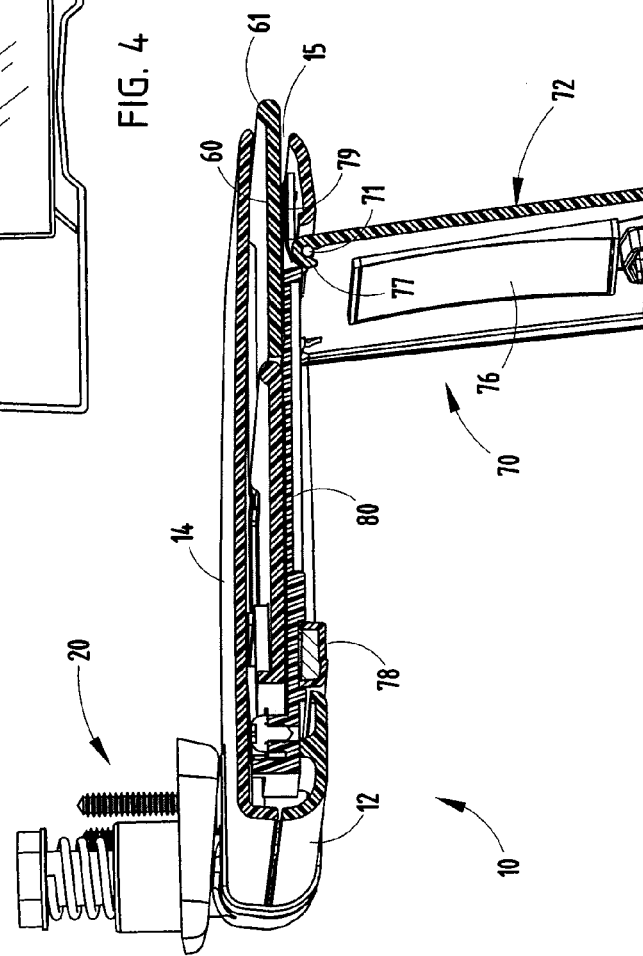
FIG. 4
FIG. 5

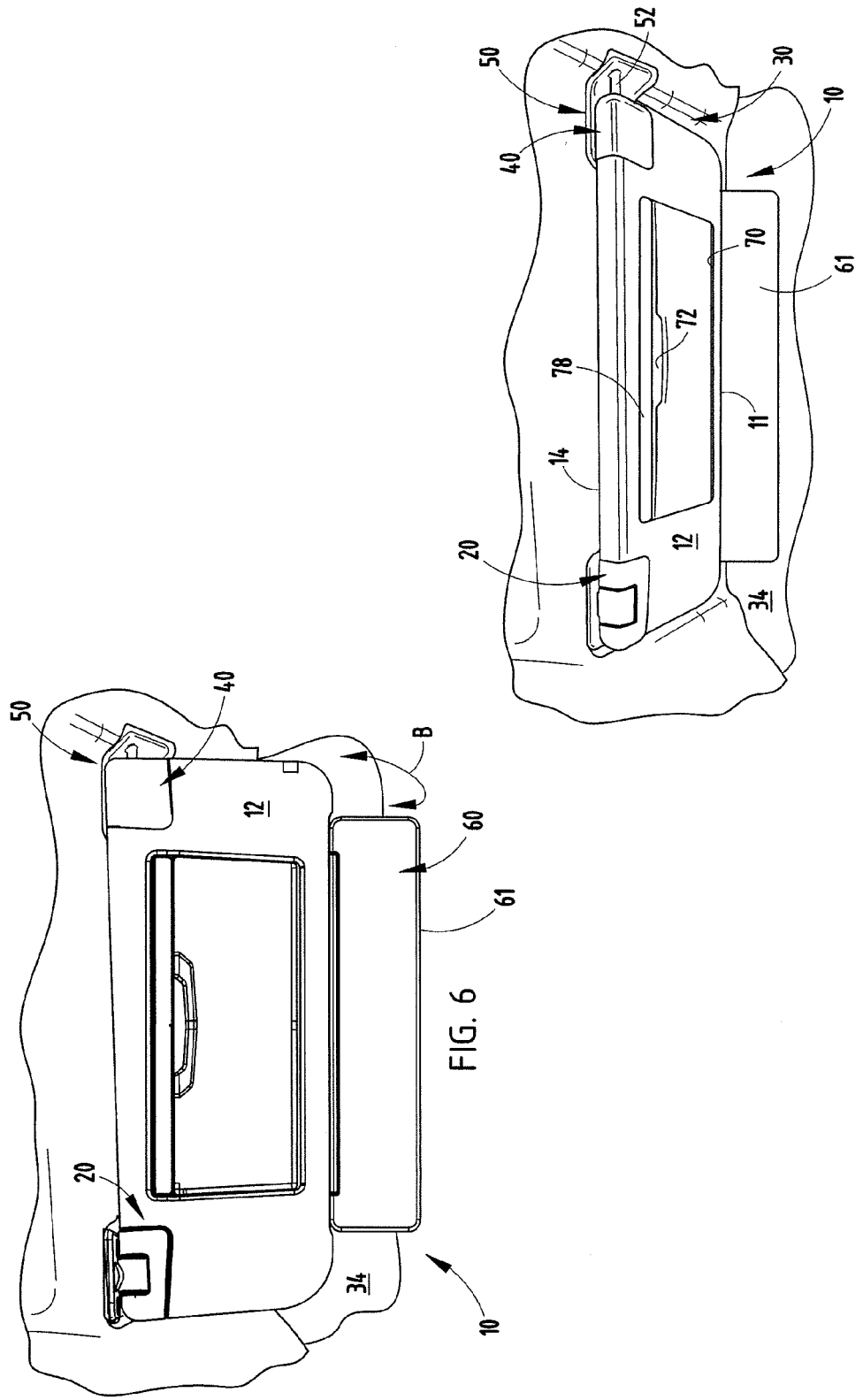

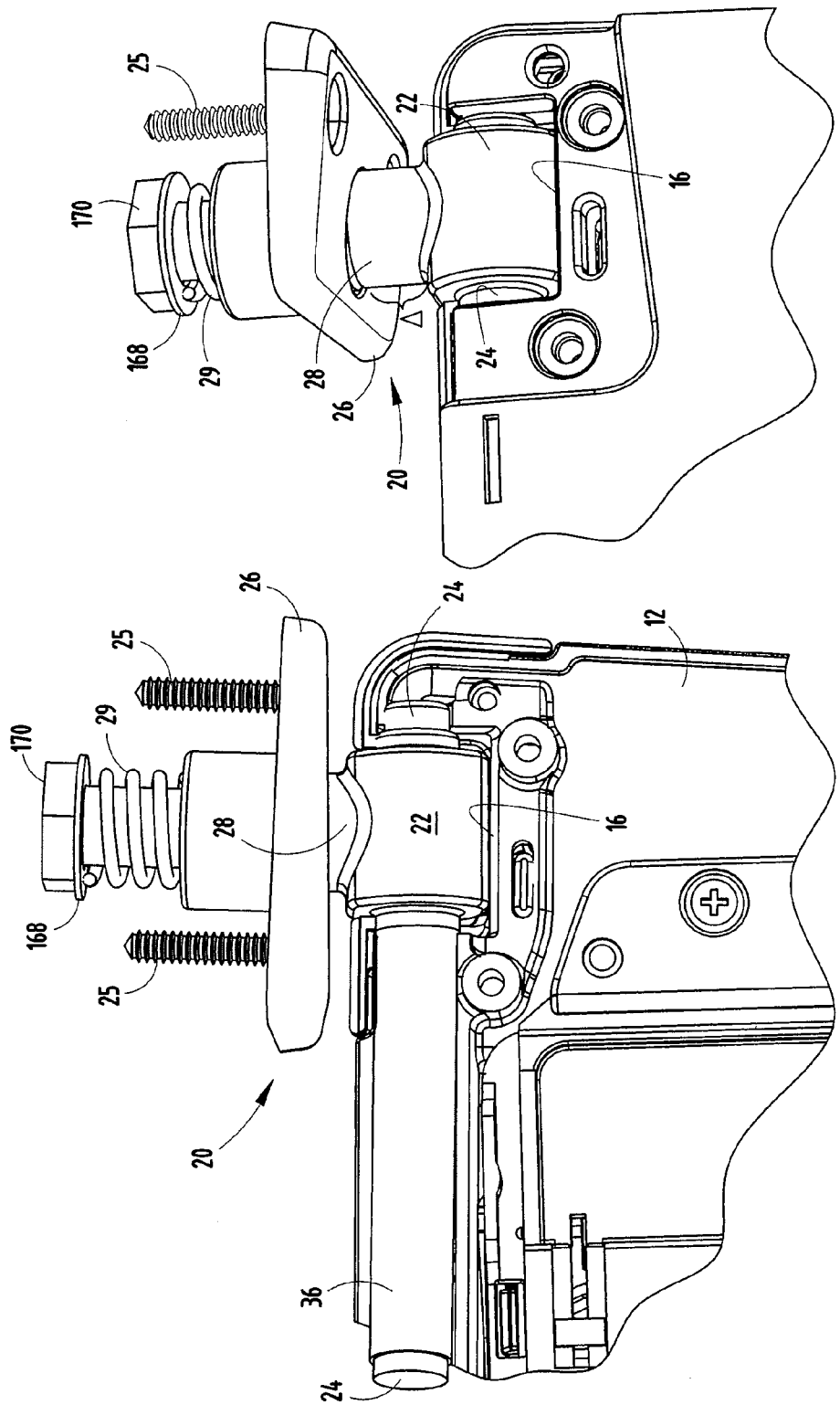

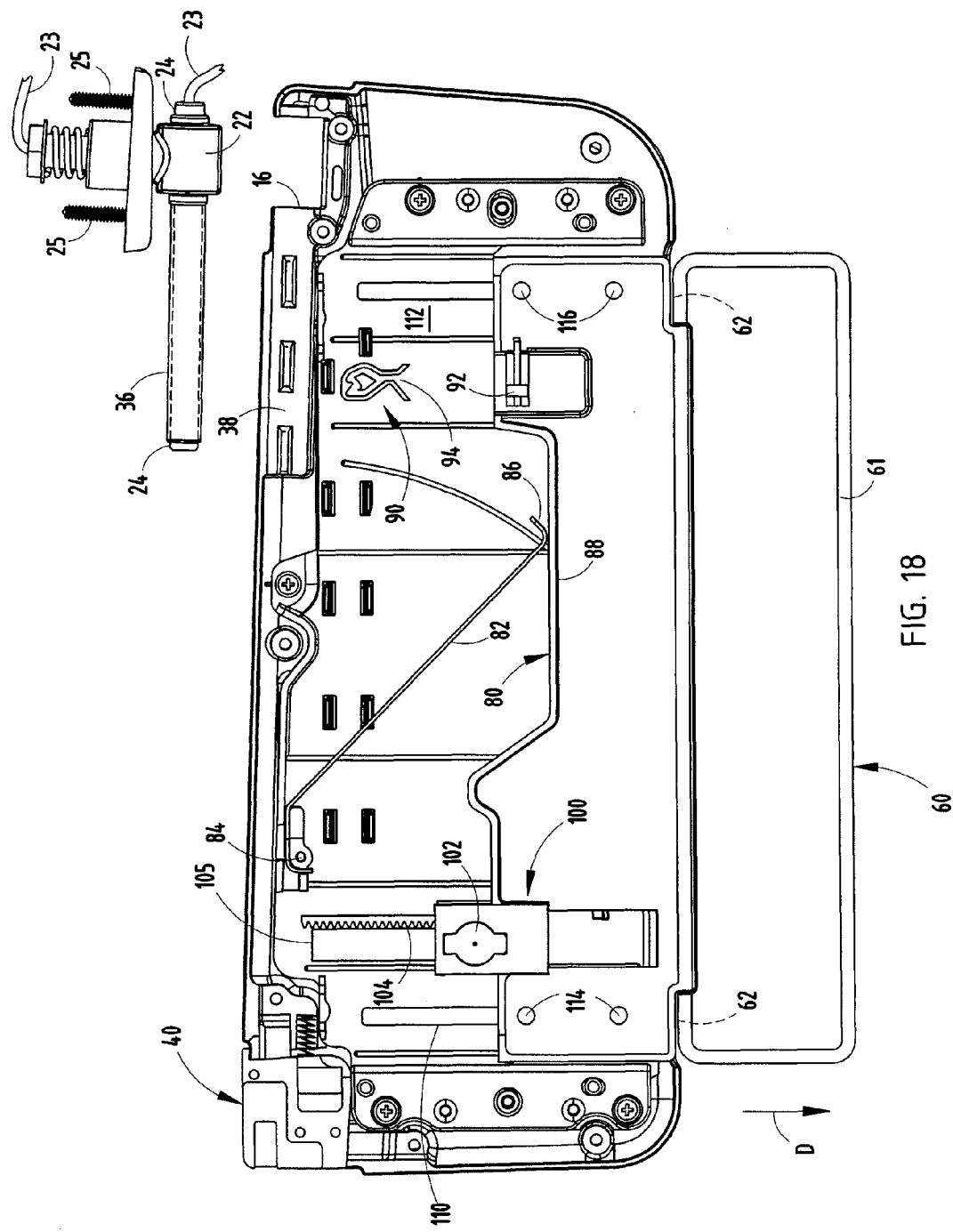

VISOR

CROSS-REFERENCE TO RELATED APPLICATIONS

This application claims priority under 35. U.S.C. §119(e) and the benefit of U.S. Provisional Application No. 61/054,916. entitled EXTRUDED VISOR ASSEMBLY, filed on May 21, 2008, by Konrad H. Marcus, the entire disclosure of which is incorporated herein by reference.

BACKGROUND OF THE INVENTION

The present invention relates to vehicle visors and particularly to a unique mounting structure for attaching the visor to a vehicle.

Typically visors are mounted to a vehicle with a pivot hinge arrangement coupled to the vehicle roof near or at the A-pillar of the vehicle. When used, such visors are pivoted downwardly in a direction toward the windshield passing momentarily through the forward line of sight of the occupant as it is moved to a sun-blocking position. Also, conventional visor mounts frequently employ an auxiliary releasing clip at an end opposite the pivot connection to allow the visor to be released from the front windshield position and pivoted to a side window position. When so manipulating a visor, it sometimes becomes necessary for the occupant to duck his/her head to allow the visor to pass through the head area of the vehicle interior.

With conventional mounting systems for vehicle visors, at least two safety issues are presented. First, the operator is momentarily distracted while manipulating the visor for use either in the front windshield position, since it passes through the line of sight, and again when it is pivoted to a side window position. Secondly, when pivoted downwardly, the visor may in some adjusted positions present an edge which projects toward the user's head and, in the event of an accident with or without air bag deployment, could cause serious injury despite the requirements that the edges of the visor have required curved edges.

Newer vehicle designs have become more aerodynamic, partly to conserve fuel, and, in such designs, conventional visor mounting systems place the visors further rearwardly even closer to the occupant's head, which makes it more difficult to manipulate the visor without distracting, particularly, the vehicle operator.

There exists a need, therefore, for a visor system which can be mounted to a vehicle in a manner which provides excellent sun-blocking properties, is easy to maneuver, eliminates some of the safety issues, and still provides features to which consumers have become accustomed, such as illuminated vanity mirrors, extendable sun-blocking or filtering panels, and the like.

SUMMARY OF THE INVENTION

The visor of the present invention satisfies this need by providing a unique mounting arrangement of the visor to the vehicle roof. The visor includes a pivot mount positioned rearwardly of the windshield, such that the visor pivots forwardly to a stored position against the vehicle headliner and rearwardly and downwardly toward the vehicle occupant in a motion opposite conventional visors. In one embodiment, the pivot mount includes a cam assembly which, once the visor is lowered and is pivoted to the side window position, lowers the visor somewhat to clear the headliner and provide improved sun-blocking performance at the side window.

According to another feature of the invention, on the edge of the visor opposite the pivot mount, a two-axis releasable mounting bracket is provided on the visor which engages a mounting clip including a locking post mounted to the vehicle headliner for securing the visor in a stored position against the vehicle headliner but releases the visor to allow the visor to pivot down. The visor mounting bracket also includes a socket engaging a pivot axle of the mounting clip to allow the visor to pivot rearwardly from a stored to a lowered use position. The visor bracket can be disengaged from the pivot axle, allowing the visor to pivot to a side window position.

In one preferred embodiment of the invention, the visor includes a spring-loaded extendable and retractable sun-blocking or screening panel which can be pivotally adjusted with the visor in a raised stored position or a lowered use position to provide a selectable amount of sun-blocking protection. The auxiliary panel, in one embodiment, is coupled to a slide-out panel controllably mounted within the body of the vehicle visor utilizing a damper control and spring-loaded, push-push release locking mechanism.

In another preferred embodiment of the invention, the visor includes a covered illuminated vanity mirror having a light bar extending above the cover to serve as a map lamp, courtesy lamp, and/or facial illuminating light source when the cover is moved to an open position for use. In yet another preferred embodiment of the invention, the inside of the cover includes a magnifying mirror for assisting the user in detailed facial makeup. Also, the visors can be manufactured with the pivot assembly and mounting bracket on either side such that both the driver and passenger can have similar visors for their use.

Thus, with the visor of the present invention, a unique mounting arrangement is provided in which the visors are mounted rearwardly of the windshield and pivoted downwardly away from the windshield from a stored position within a pocket formed in a vehicle headliner and, if accidentally bumped by the vehicle operator or occupant, it will pivot forwardly toward the windshield as opposed to possibly presenting an edge. Such a visor can provide improved side window protection and can include additional desirable features, such as illuminated vanity mirrors, extendable panels, and the like.

These and other features, objects and advantages of the present invention will become apparent upon reading the following description thereof together with reference to the accompanying drawings.

BRIEF DESCRIPTION OF THE DRAWINGS

FIG. 2 is a perspective view of the visor shown in FIG. 1, shown in a first lowered use position;

FIG. 3 is a perspective view of the visor shown in FIG. 2, shown with the mirror cover in a lowered position exposing the mirrors for use;

FIG. 4 is a fragmentary perspective view of the visor shown in a stored position with the mirror cover in a first lowered use position;

FIG. 5 is a cross-sectional view of the visor shown in FIG. 4, taken along section line V-V of FIG. 4;

FIG. 6 is a perspective view of the visor shown in FIG. 2, shown with a push-push extension panel extended;

FIG. 7 is a perspective view of the visor shown in the stored position of FIG. 1 but with the extension panel extended from the visor body to provide protection near the upper edge of the windshield;

FIG. 14 is a fragmentary perspective view of the pivot mounting bracket assembly, partly broken away, with the visor shown in a lowered position in the front windshield position as viewed through the windshield;

FIG. 15 is a fragmentary perspective view of the pivot mounting bracket assembly, partly broken away, shown with the visor moved to the side window position;

FIG. 18 is a view of the structure shown in FIG. 17, shown partly exploded away and showing the auxiliary panel extended from the visor body.

DETAILED DESCRIPTION OF THE PREFERRED EMBODIMENT

Figure 1:
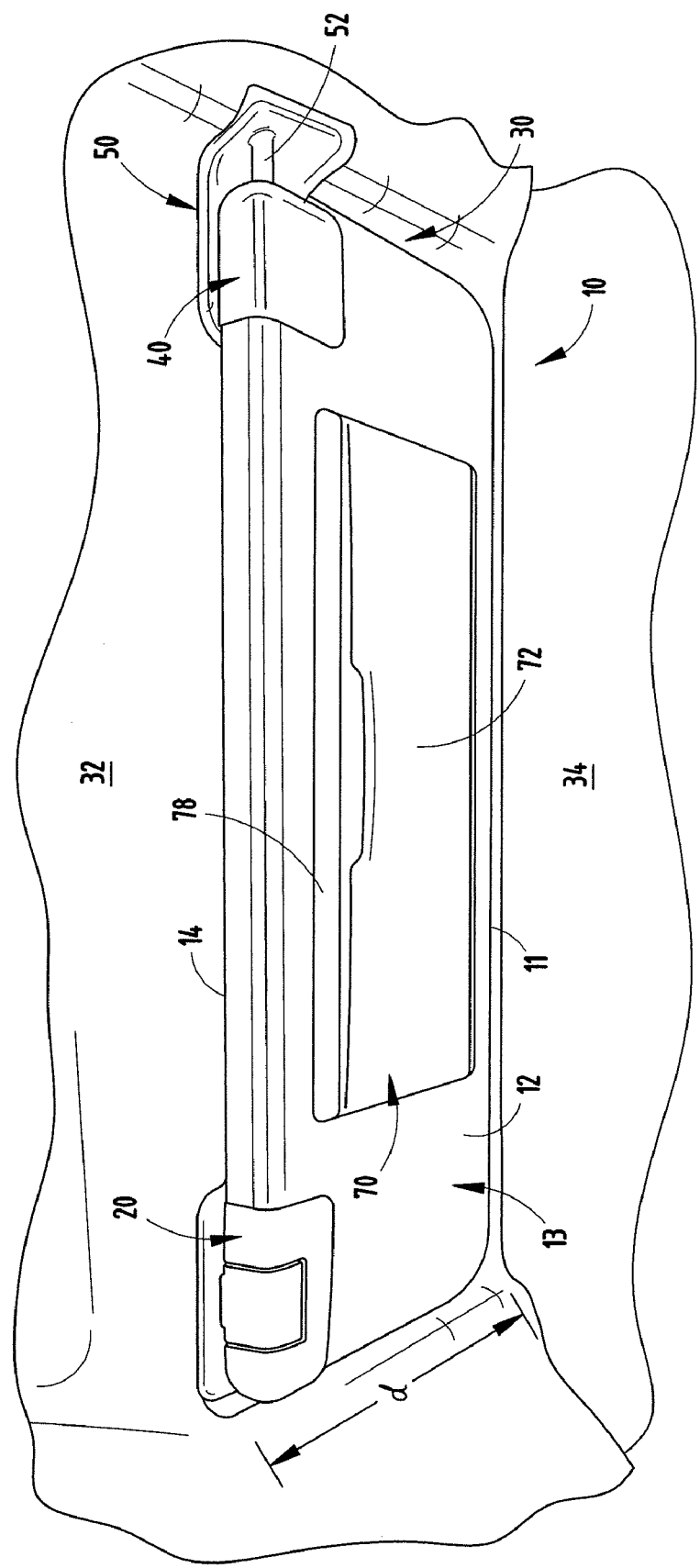
FIG. 1 is a fragmentary perspective view of a vehicle including a visor embodying the present invention, shown in a stored position against the vehicle headliner.

Referring initially to FIG. 1, there is shown a visor assembly 10 of the present invention which includes a pivot mounting assembly 20, which mounts the visor assembly 10 within a forward pocket 30 of a vehicle headliner 32 immediately adjacent the vehicle's windshield 34. The pivot assembly 20 is positioned rearwardly of the windshield 34 and attached to the headliner 32 or underlying sheet metal structure of the vehicle roof. It is spaced a distance "d", in one embodiment, of approximately 6½ inches, such that the forward edge 11 of the visor assembly 10 is immediately adjacent the vehicle windshield 34. This distance will vary depending upon the height of the body of visor 10. Visor assembly 10 also includes a mounting bracket assembly 40 at an end of the visor 10 opposite pivot mounting assembly 20, which holds the right edge of the visor (as viewed in FIG. 1) in a stored position as described below and shown in FIG. 1 but releasably allows the visor to pivot downwardly and rearwardly toward the operator as illustrated by arrow A in FIG. 2 to a first use position.

Figure 9:
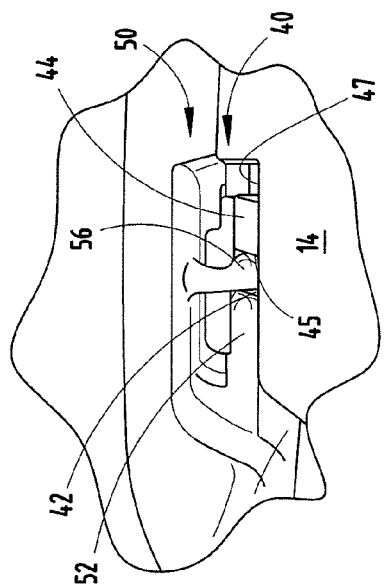
FIG. 9 is a fragmentary perspective view as viewed through the windshield of the visor mounting bracket and the mounting clip assembly coupled to the vehicle, showing the locking post being removed from the mounting clip.
Figure 10:
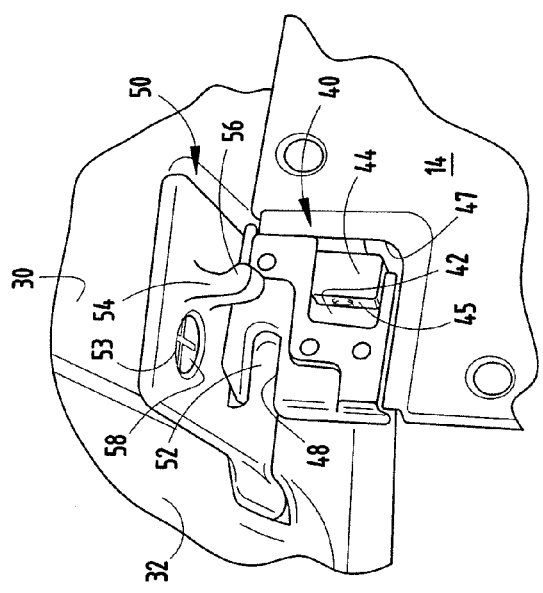
FIG. 10 is a fragmentary perspective view as viewed through the windshield of the mounting bracket and mounting clip assembly, shown with the visor in a lowered position and captively held by the pivot axle of the mounting clip assembly.

Mounting bracket assembly 40 cooperates with a mounting clip assembly 50 which includes, as best seen in FIGS. 1 and 10, a pivot axle 52 allowing the visor assembly 10 to be pivoted downwardly from the stored position in FIG. 1 to a lowered use position, as shown in FIGS. 2-4, and pivoted to various adjusted positions as well. The mounting clip assembly 50 further includes a locking post 54 (FIGS. 8-10) spaced from pivot axle 52 and having an axis extending in a direction orthogonal to the axis of pivot axle 52. Post 54 has an enlarged rounded head 56 for releasably engaging mounting bracket 40 and allowing visor 10 to move from a stored position in pocket 30 of the headliner 34 to lowered use positions, as described in greater detail below.

Visor assembly 10 is molded of a polymeric material, such as polypropylene, polyvinylchloride, or other suitable material which can be covered with upholstery or textured as desired to conform to the vehicle's interior surroundings. The visor body 13 is of a clamshell construction having a first or rearward facing panel 12 and a forward or top panel 14, as seen in FIG. 1. Panels 12 and 14 are joined together during assembly in a conventional manner well known to visor manufacturers. This may include adhesive bonding, ultrasonic welding, heat staking, or other conventional methods of coupling clamshell visor halves together. Some of the functional positions of the visor capable with the unique mounting structure for visor assembly 10 are illustrated in FIGS. 2-6. In FIG. 2, the visor is shown in a lowered position pivoting about pivot assembly 20 and mounting bracket assembly 40 to a lowered front window position by drawing the front edge 11 of the visor rearwardly toward the user in a direction opposite a conventional visor mount. In this position, visor assembly 10 can be pivoted forwardly and rearwardly as desired to provide front windshield sun-blocking protection for the driver, in the embodiment shown in FIG. 1, or for a mirror image visor mounted on the passenger side of the vehicle for the passenger.

As seen in FIG. 3, when visor assembly 10 is lowered, an illuminated vanity mirror assembly 70, which includes a pivoted cover 72, can be opened to expose a relatively large rectangular mirror 74 mounted to panel 12 while the inside surface 73 of cover 72 includes a magnification mirror 76 (such as 3:1) to provide greater detail for the user. A light pipe 78 is positioned above the cover and is illuminated at opposite ends by white LEDs which can be coupled to the vehicle's electrical system to serve as a courteously lamp when doors are opened, a map reading lamp when actuated by a separate switch or when cover 72 is opened utilizing handle 75 to actuate a switch (not shown) to provide illumination to the face of the user.

FIG. 4 illustrates another use position of the visor 10. In this position, the visor is in a stored position and the cover 72 can be lowered to expose the magnification mirror 76 to the user. FIG. 5 is a cross-sectional view of the visor of FIG. 4 showing the mounting of the auxiliary extension panel 60 within the body of the visor and its pivot coupling to the control panel 80 (described in connection with FIGS. 17 and 18). The cover 72 is pivotally mounted to the visor body 13 by pivot pins 71 and sockets 77. Springs 79 cooperate with sockets 77 to provide a detent position, as seen in FIG. 5, for the cover and also for allowing the cover to be lowered to a position coplanar with the visor body, as shown in FIG. 3.

FIG. 6 illustrates the use of an auxiliary extension panel 60 which extends from slot 15 at the lower edge of visor body 13 and is pivotally mounted to a retractable internal control panel 80 (FIGS. 15 and 16), as described below, to provide additional sun blocking or screening protection for visor assembly 10. Panel 60 can pivot forwardly and rearwardly in a direction indicated by arrow B in FIG. 6 to adjust the sun-blocking or filtering positions. Panel 60 can be made of an opaque material, a tinted polymeric material, a polarized material, a micro louver material, a phototropic material, an electrochromic material, or a combination thereof to provide either see-through or complete sun-blocking protection for the user.

Figure 8:
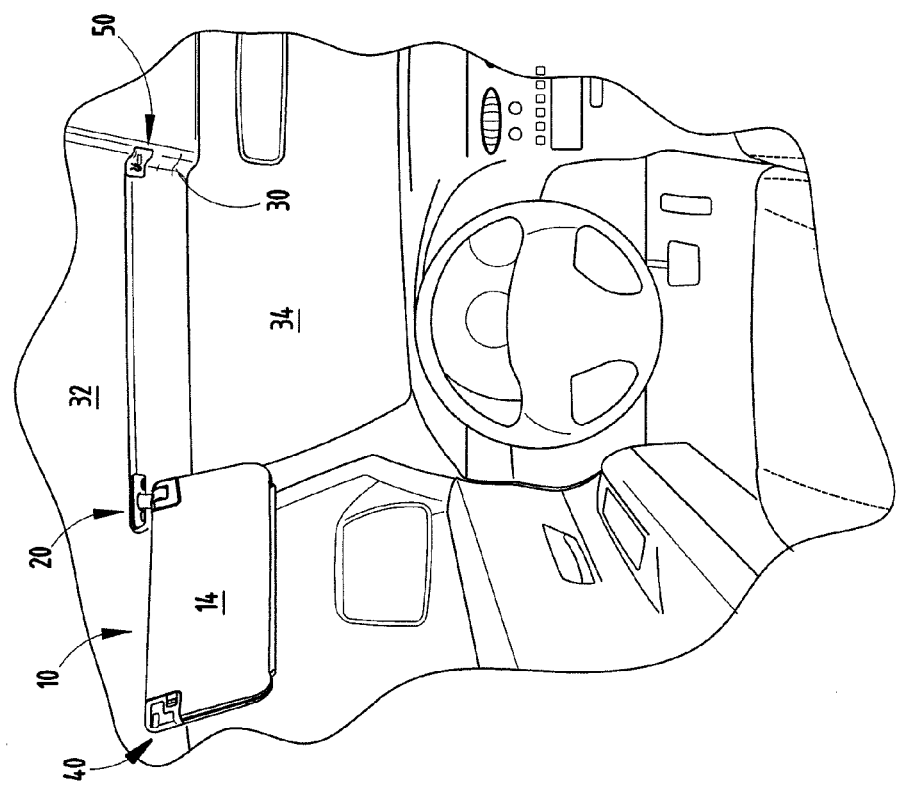
FIG. 8 is a perspective view of the visor shown in FIG. 2, pivoted to a side window position.

Another unique feature of the mounting of the visor assembly 10 is shown in FIG. 7, in which the visor 10 is shown in a raised stored position after the auxiliary panel 60 is extended, such that, if desired, coverage of only the pivoted extension panel 60 can be employed by the vehicle occupant. Thus, the occupant has the capability of providing single visor protection (as shown in FIG. 2), extended visor protection (as shown in FIG. 6), or the auxiliary panel protection (as shown in FIG. 7), all at the front window position. By releasing the mounting bracket assembly 40 from the mounting clip assembly 50, the visor can be pivoted, once lowered, to the side window position, as shown in FIG. 8.

In the position shown in FIG. 8, the pivot bracket assembly 20, as described in greater detail below, lowers the visor slightly to provide clearance as the visor moves in the direction indicated by arrow C in FIG. 8, to clear the headliner 32 and provide greater protection for the side window. In view of the fact that assembly 20 is positioned rearwardly of the windshield/headliner interface, the visor, once moved to a side window position, aligns better with the occupant's face and eyes, thereby providing better protection from incoming sunlight from the side window area.

Having generally described the various functional positions of the visor assembly 10 embodying the present invention, a description first of the unique visor mounting bracket assembly 40 for cooperation with the mounting clip assembly 50 coupled to the vehicle is now described in relation to FIGS. 9-13.

Figure 13:
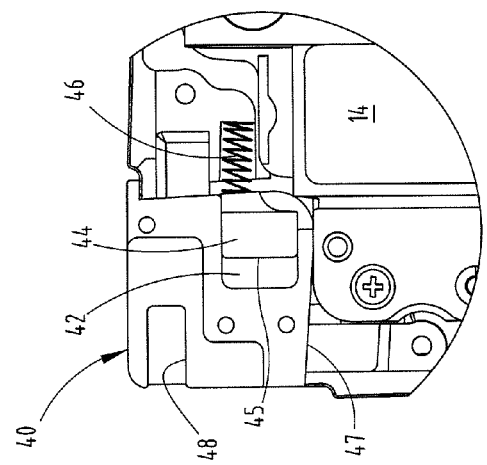
FIG. 13 is an enlarged fragmentary plan view of the mounting bracket on the visor showing the socket for the pivot axle and a spring-loaded catch for the locking post.

In FIG. 9, the visor 10 is shown in the position in which the head 56 of the locking post 54 of clip 50 is just exiting the pocket 42 of mounting bracket assembly 40. Pocket 42 is formed in bracket 40, as best seen in FIG. 13, in which a sliding locking catch 44 is slideably, captively held within the pocket 42 and urged to a position to the left, as seen in FIG. 13, by compression spring 46 to engage the head 56 of post 54 in a locking fashion for holding the visor in a stored position, as illustrated in FIG. 1. The edge 45 of catch 44 is concavely curved to partially circumscribe the rounded end 56 of post 54 to provide increased holding tolerance of the surface of visor panel 14 against the surface of headliner 32 within visor receiving pocket 30. Catch 44 and post 54 allow the visor to be pivoted downwardly, as seen in FIG. 2, by grasping the forward edge of the visor and pulling the visor rearwardly toward the occupant. Spring 46 is captively held within a pocket 47 in the visor panel 14 and allows catch 44 to release post 54 with a normal visor pull-down force. The integration of the locking post 54 closely adjacent the pivot pin 52 allows a single clip 50 to be employed for the multiple functions of holding the visor in a stored position, allowing its downward rotation, and swinging to a side position. This use of the spring-loaded locking catch 44 in bracket assembly 40 facilitates this compact construction. Mounting bracket assembly 40 also includes a semicircular socket 48 extending in the direction of the axis of rotation of the visor assembly 10 for snap-fit receiving the pivot axle 52 of mounting clip 50.

FIG. 10 illustrates the removal of the visor assembly 10 from the locking post 54 while the mounting clip assembly 50 retains the visor in a forward position with pivot axle 52 inserted within socket 48 to allow the visor to pivot forwardly and rearwardly in a direction indicated by arrow A in FIG. 2. As can be appreciated, the pivot axle 52 on clip assembly 50 and socket 48 in pocket 40 could be reversed to provide the same pivot-down function for visor 10.

Figure 11:
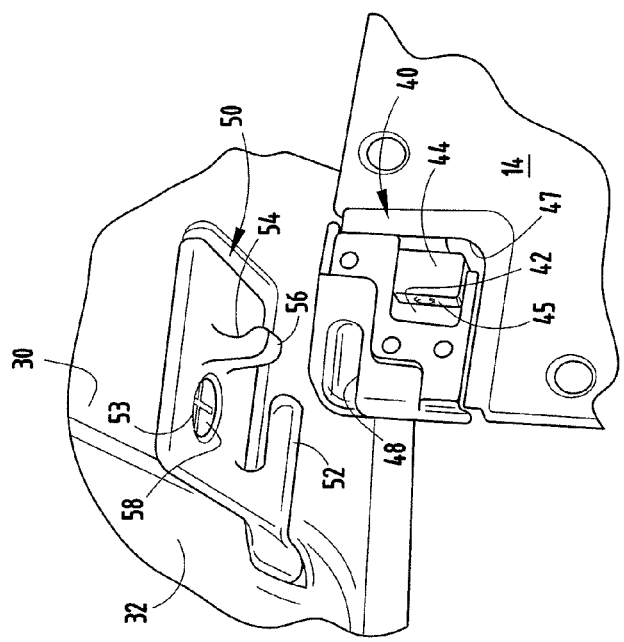
FIG. 11 is a fragmentary perspective view as viewed through the windshield of the visor mounting bracket and mounting clip assembly on the vehicle, showing the visor released to allow it to pivot to a side window position.
Figure 12:
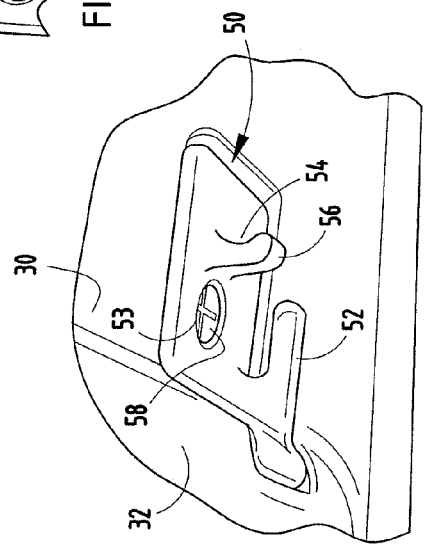
FIG. 12 is a perspective view as viewed through the windshield of the mounting clip assembly which is mounted to the vehicle headliner.

As shown in FIG. 11, a vehicle occupant can release the visor from the forward windshield position by pulling on the right edge of the visor (as illustrated in the driver's side of FIG. 2) to free the pivot axle 52 from socket 48, allowing the visor to be moved to the side window position shown in FIG. 6. As seen in FIG. 12, the mounting clip 50 is shaped to conform to the edge of the headliner pocket 30 and includes a recessed aperture 53 for receiving a fastener 58 to secure the auxiliary mounting assembly to the roof of the vehicle either directly to the headliner 32 or through a backing sheet metal member behind the headliner 32.

Figure 16:
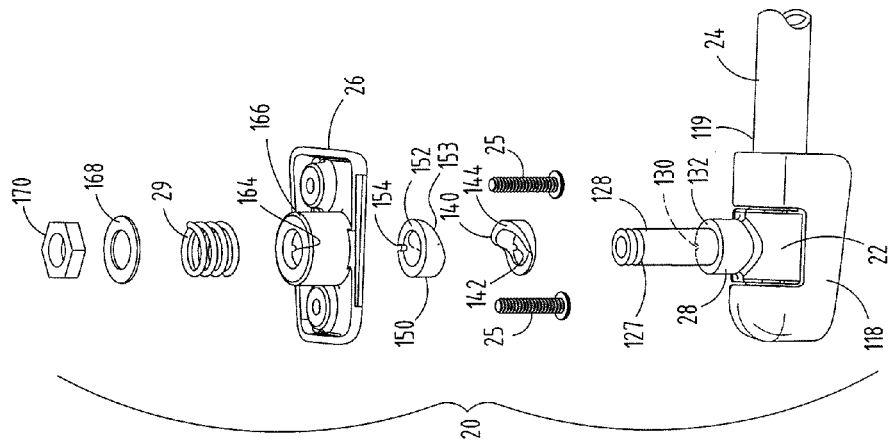
FIG. 16 is an exploded perspective view of the pivot mounting bracket assembly.

The pivot assembly 20 is shown in FIGS. 14-16 and includes a cylindrical collar 22 which integrally includes a pivot axle 24. The pivot assembly 20 includes a mounting bracket 26 which is secured to the roof and/or headliner of a vehicle by means of fasteners 25 extending through apertures in bracket 26 securing assembly 20 and the visor 10 held thereto to the headliner and/or underlying support sheet metal roof of the vehicle. Collar 22 is integral with a hollow vertically extending post 28 which extends through bracket 26 and is spring-loaded to hold the collar 22 closely adjacent bracket 26 utilizing a compression spring 29 in a conventional manner. The pivot axle 24 extends within a friction collar 36 mounted against rotation within a socket 38 formed in visor panel 12, as seen in FIG. 18, such that the frictional torque for raising and lowering the visor assembly 10 is achieved by the frictional interface between fixed collar 36 and rotating pivot axle 24 extending therethrough.

When assembled, the first and second panels 12 and 14 are secured together for lockably receiving cylindrical collar 36 when completing the visor construction. As the visor is pivoted from the front windshield position shown in FIG. 14 to the side window position shown in FIG. 15, post 28 is cammed to extend from bracket 26 an incremental distance Δ, as shown in FIG. 15. Thus, as the visor moves from a front window position to the side window position, the visor is lowered to clear the headliner 32.

The camming action to provide the lowering of visor 10 as it moves from the front window position to the side window position is best seen in FIG. 16. As seen in FIG. 16, the bracket assembly 20 is covered by a pair of decorative covers 118 and 119 to finish the corner of the visor, providing a trim appearance to the overall visor assembly 10. The post 28 includes a reduced diameter section 128 with a slot 130 on the ledge 132 between the post 28 and reduced diameter section 128. A first cam member 140 has a tab 142 which fits within slot 130 to prevent rotation of cam 140 with respect to post 28. Cam 140 is generally a cylindrical washer shaped member with a tapered camming surface 144 which mates with a correspondingly tapered camming surface 153 of cam member 150. Cam member 150, in turn, is also generally cylindrical with a flat upper surface 152 having a slot 154 which engages a tab 164 in a mounting boss 166 integrally formed on bracket 26. Thus, cam member 150 is held against rotation with respect to bracket 26 while cam 140 is held against rotation with respect to post 28. The relative rotation of post 28 with respect to bracket 26, therefore, causes the spring 29 to compress against washer 168 held by backing nut 170 to the threaded end 127 of section 128, thereby lowering the visor a distance Δ, as shown in FIG. 15, as the visor is rotated from the front window position to the lowered window position. The slope of camming surfaces 144 and 153 determines the amount of lowering of the visor and can be adjusted for a given visor installation in a vehicle.

In order to support pivot axle 24 and collar 22, panel 12 of the visor body, as shown in FIG. 18, includes a reinforced notch 16 and sockets 38 which are sufficiently robust, once panel 14 is secured to panel 12, to secure the pivot assembly 20 and friction collar 36 to the visor 10. The vertical post 28 and pivot axle 24 are hollow and provide a communication path within the headliner through members 28 and 24 for one or more electrical conductor(s) 23 (FIG. 18) to provide illumination for the LEDs (not shown) for illuminating light bar 78.

Figure 17:
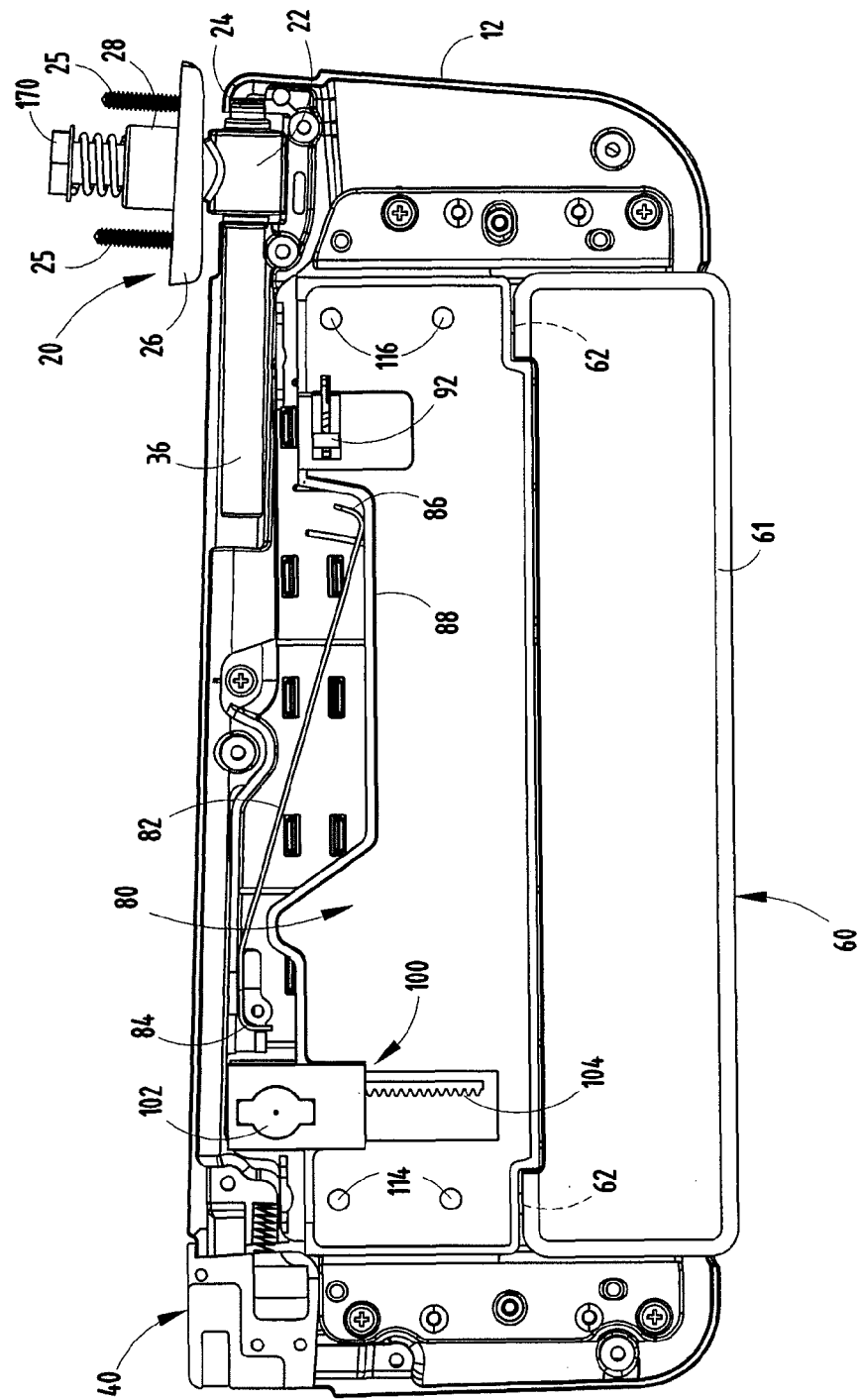
FIG. 17 is a plan view of the visor partly disassembled, showing the internal components of the visor, including the auxiliary slide-out panel and its mounting to the retractable control panel and shown in a retracted position.

The mounting and control of the auxiliary extension panel 60 is now described in connection with FIGS. 17 and 18, which show the internal cavity for visor panel 12 which receives the auxiliary panel when retracted, as shown in FIG. 17, and allows its extension, as shown in FIG. 18. The auxiliary panel 60 is pivotally coupled to a movable control panel 80 by pivot pins 62 extending between the opposite corners of the panels 60 and 80 to allow panel 60 to pivot once extended, as shown in FIGS. 6, 7, and 18. Panel 60, thus, moves in and out of the visor with the control panel 80 under the influence of a leaf spring 82 fixedly coupled at one end to a post 84 and having a free end 86 engaging a rib 88 on panel 80. The control panel 80 is latched in the retracted position, as shown in FIG. 17, by a conventional heart-shaped racetrack latch 90, shown in FIG. 18, which receives a laterally slideable pin 92 entering slot 94 of latch 90 to hold the control panel 80 in a latched position as shown in FIG. 17 when retracted. When the lower extending edge 61 of panel 60 is depressed (i.e., pushed upwardly opposite arrow D) by the vehicle occupant, pin 92 releases from the racetrack latch 90 and under the influence of spring 82, control panel 80 and attached panel 60 are moved downwardly to extend the panel into a position, such as shown also in FIGS. 6 and 7. The border of panel 60, including edge 61, is rounded to conform to automotive industry standards.

In order to control the motion, a damper mechanism 100 is provided comprising a rotary damper 102 with a toothed wheel engaging a rack 104 mounted on the fixed inner surface of visor panel 12. In addition, the visor panel 12 includes a pair of vertically extending slots 110, 112 on opposite edges (FIG. 18) which receive posts 114, 116 of control panel 80 to prevent cocking or skewing of control panel 80 and auxiliary panel 60 coupled thereto as it moves between retracted and extended positions. If desired, a polymer film 105 can be positioned between the damper 100 and the inner surface of visor panel 12 to assure smooth damper operation as panel 60 is extended and retracted.

Thus, the visor of the present invention includes unique functional positions for use of the visor, vanity mirrors associated with the visor, and an extendable panel. The visor includes unique mounting structure which allows its compact structure and ease of use.

It will become apparent to those skilled in the art that various modifications to the preferred embodiment of the invention as described herein can be made without departing from the spirit or scope of the invention as defined by the appended claims.

The invention claimed is:

1. A vehicle visor comprising:
a visor body;
a pivot mount coupled to one end of said visor body for coupling said visor body to a vehicle such that said visor rotates from a stored position adjacent a vehicle headliner downwardly and away from a vehicle windshield to a selected use position, wherein said pivot mount allows said visor to rotate to a side window position and includes a cam for lowering said visor as it is moved to a side window position;
a mounting bracket coupled to an end of said visor body opposite said one end for releasably holding said visor in a stored position adjacent the headliner and allowing said visor to pivot downwardly and to a side window position; and
a mirror assembly coupled to said visor body and including a flat mirror and a magnifying mirror positioned in spaced relationship to each other, and further including an illumination source for said mirrors.

2. The visor as defined in claim 1 wherein said flat mirror is mounted to one side of said visor which includes a cover for said flat mirror, wherein said cover is pivotally mounted to said visor body to pivot downwardly below said visor body when in an open position to expose said flat mirror.

3. The visor as defined in claim 2 wherein said magnifying mirror is mounted to a side of said cover facing an occupant when said cover is in an open position.

4. A vehicle visor comprising a visor body having a retractable auxiliary glare shield, wherein said visor includes:
a visor body;
a control panel slideably mounted within said visor body to extend from a retracted position to an extended position;
an auxiliary glare shield pivotally coupled to an edge of said control panel; and
wherein said visor body includes a spring for urging said control panel to an extended position and a push-push latch for releasing said control panel to urge said glare shield to an extended use position outside said visor body.

5. The visor as defined in claim 4 wherein said visor body includes a damper coupled to said control panel to control the motion of said glare shield.

6. The visor as defined in claim 5 wherein said visor body includes a pair of spaced-apart guide tracks for controlling the motion of said control panel.

7. A vehicle visor comprising:
a visor body;
a headliner including a recessed pocket for receiving said visor body when in a raised stored position;
a pivot mount coupled to one end of said visor body for coupling said visor body to a vehicle in spaced relationship rearwardly from the vehicle windshield such that said visor rotates from a stored position adjacent a vehicle headliner downwardly and away from the vehicle windshield to a selected use position; and
a mounting bracket coupled to an end of said visor body opposite said one end for releasably holding said visor in a stored position within said pocket of said headliner and allowing said visor to pivot downwardly and to a side window position.

8. The visor as defined in claim 4 and further including a pivot mount coupled to said visor body for coupling said visor body to a vehicle such that said visor rotates from a stored position adjacent a vehicle headliner downwardly and away from a vehicle windshield to a selected use position.

9. The visor as defined in claim 4 wherein said glare shield is made of one of an opaque, micro-louver, transparent, tinted, translucent, polarized, phototropic, and electrochromic material.

10. The visor as defined in claim 4 and further including a mirror assembly.

11. The visor as defined in claim 10 wherein said mirror assembly includes a flat mirror and a magnifying mirror positioned in spaced relationship to each other.

* * * * *